United States Patent [19]

Thaler et al.

[11] Patent Number: 5,190,797

[45] Date of Patent: Mar. 2, 1993

[54] COATING A SUBSTRATE WITH AN IONOMER

[75] Inventors: Warren A. Thaler, Flemington; Cruise K. Jones, Glen Gardner; Evelyn N. Drake, Bernardsville; Pacifico V. Manalastas, Edison; Edward N. Kresge, Watchung, all of N.J.

[73] Assignee: Exxon Research and Engineering Company, Florham Park, N.J.

[21] Appl. No.: 720,042

[22] Filed: Jun. 24, 1991

[51] Int. Cl.$^5$ .............................. B05D 3/02
[52] U.S. Cl. ........................ 427/385.5; 427/212; 427/213.3; 71/64.07; 71/64.11
[58] Field of Search ............ 427/212, 213.3, 385.5; 71/64.02, 64.07, 64.11

[56] References Cited

U.S. PATENT DOCUMENTS

| | | | |
|---|---|---|---|
| 4,145,379 | 3/1979 | Lundberg et al. | 525/263 |
| 4,701,204 | 10/1987 | Duvdevani et al. | 427/221 |
| 4,741,956 | 5/1988 | Thaler et al. | 427/222 |
| 4,788,081 | 11/1988 | Thaler et al. | 427/212 |
| 4,979,980 | 12/1990 | Thaler et al. | 71/64.02 |
| 4,988,377 | 1/1919 | Manalastas et al. | 71/64.02 |
| 5,006,147 | 4/1991 | Thaler et al. | 71/27 |

Primary Examiner—Michael Lusigan
Assistant Examiner—Diana Dudash
Attorney, Agent, or Firm—Joseph J. Dvorak

[57] ABSTRACT

The present invention relates to a process for the encapsulation of a solid substrate with a neutralized sulfonated polymer, which comprises the steps of: (a) forming a solution of a non-conjugated, diene polymer in a solvent selected from the group consisting of aliphatic, aromatic hydrocarbons and mixtures thereof; (b) contacting the solution of the unsaturated polymer with a sulfonating agent at a sufficient temperature and for a sufficient period of time to form a solution of a sulfonated polymer containing free acid; (c) forming a solution of a base selected from the group consisting of alkali metal hydroxides and mixtures thereof in a mixtrue of an aliphatic alcohol and a hydrocarbon, the hydrocarbon being selected from the group consisting of aliphatic and aromatic hydrocarbons and mixtures thereof; (d) adding the solution of base to the solution of sulfonated polymer in an amount sufficient to neutralize the polymer and the free acid, thereby forming a coating solution; (e) contacting the solid substrate with the coating solution while removing the solvent therefrom, thereby forming an encapsulated substrate. In a preferred embodiment, the solvent removed during step (e) is recovered and distilled to separate the solvent into at least two fractions, a fraction containing substantially hydrocarbon and an alcohol containing fraction. The separated solvents are then recycled to dissolve the polymer in step (a) and to dissolve the base in step (c).

12 Claims, 2 Drawing Sheets

5,190,797

COATING A SUBSTRATE WITH AN IONOMER

FIELD OF THE INVENTION

The present invention relates to an improved method for coating a substrate with a thin film of an ionomer such as a sulfonated polymer. More particularly, the present invention is concerned with an improved method for encapsulating a particulate solid substrate with a thin film of a metal neutralized sulfonated polymer of ethylene-propylene-diene monomer (EPDM).

DESCRIPTION OF PRIOR ART

Solids have been coated with organic materials, such as polymers, for numerous reasons: to provide a decorative coating; to protect the solid from its environment; and for other special purposes, such as for controlled release of fertilizer and the like. No matter what the reason for applying a polymer coating to a solid substrate, it generally is desirable to provide the thinnest coating that will still achieve the desired result.

In the case of films used as a barrier to protect a substrate or control its release, to function properly, the film has to meet one or more of the following criteria: the coating material should show improved barrier properties; the applied thin coating should be a continuous film with few or no defects; and there should be a proper adhesion between the coated material and coating.

Additionally, the material used in the thin film coating should have an optimized balance of other desirable properties, such as elasticity, toughness, hardness and abrasion resistance for durability under adverse conditions and the like.

The discovery of the film forming properties of zinc neutralized sulfonated polymers of EPDM has made possible the extension of their use to coating applications, including controlled release products in agriculture (e.g., controlled release fertilizer). In controlled release fertilizer applications, coatings of zinc neutralized sulfonated EPDM polymers will act as barriers to water soluble constituents of the fertilizer, shielding them from premature release in aqueous environments for periods ranging from several days to several months. In contrast to present commercially available controlled release fertilizer products which require thick (>40 microns) coatings to yield acceptable performance (e.g., <20% release of water soluble nutrient in seven days in water at 20° C.), controlled release fertilizers have been prepared with the application of thin (<20 microns), defect-free zinc neutralized sulfonated EPDM polymers.

In forming zinc neutralized sulfonated EPDM polymers, an EPDM polymer is typically reacted with acetylsulfate and treated with zinc acetate, which results not only in the neutralization of the polymer, but also the liberation of acetic acid from both the sulfonation and neutralization. The presence of acid is, of course, undesirable. Therefore, the resulting mixture is steam stripped to remove solvent and the carboxylic acid, leaving a polymer crumb which must be dried and then redissolved in a suitable solvent in order to be used in an encapsulation process.

One object of this invention is to provide a means by which ionomer coating solutions, which give a high performance encapsulated product, can be produced and utilized without first forming and separating a polymer crumb.

Another objective is to neutralize any carboxylic acids, such as acetic acid that are formed in preparing the sulfonated ionomer, which are corrosive to the coating equipment.

Other objects of this invention will become apparent from a reading of the description which follows.

SUMMARY OF THE INVENTION

The present invention relates to a process for the encapsulation of a solid substrate with a neutralized sulfonated polymer, which comprises the steps of: (a) forming a solution of an unsaturated polyolefin or styrene polymer in a solvent selected from the group consisting of aliphatic, aromatic hydrocarbons and mixtures thereof; (b) contacting the solution of the unsaturated polymer with a sulfonating agent at a sufficient temperature and for a sufficient period of time to form a solution of a sulfonated polymer containing free acid; (c) forming a solution of a base selected from the group consisting of alkali metal hydroxides and mixtures thereof in a solvent selected from the group consisting of aliphatic alcohols and mixtures of an aliphatic alcohol and a hydrocarbon, the hydrocarbon being selected from the group consisting of aliphatic and aromatic hydrocarbons and mixtures thereof; (d) adding the solution of base to the solution of sulfonated polymer in an amount sufficient to neutralize the polymer and the free acid, thereby forming a coating solution; (e) contacting the solid substrate with the coating solution while removing the solvent therefrom, thereby forming an encapsulated substrate.

In a preferred embodiment, the solvent removed during step (e) is recovered and distilled to separate the solvent into at least two fractions, a fraction containing substantially hydrocarbon and an alcohol containing fraction. The separated solvents are then recycled to dissolve the polymer in step (a) and to dissolve the base in step (c).

GENERAL DESCRIPTION

Figure 1:
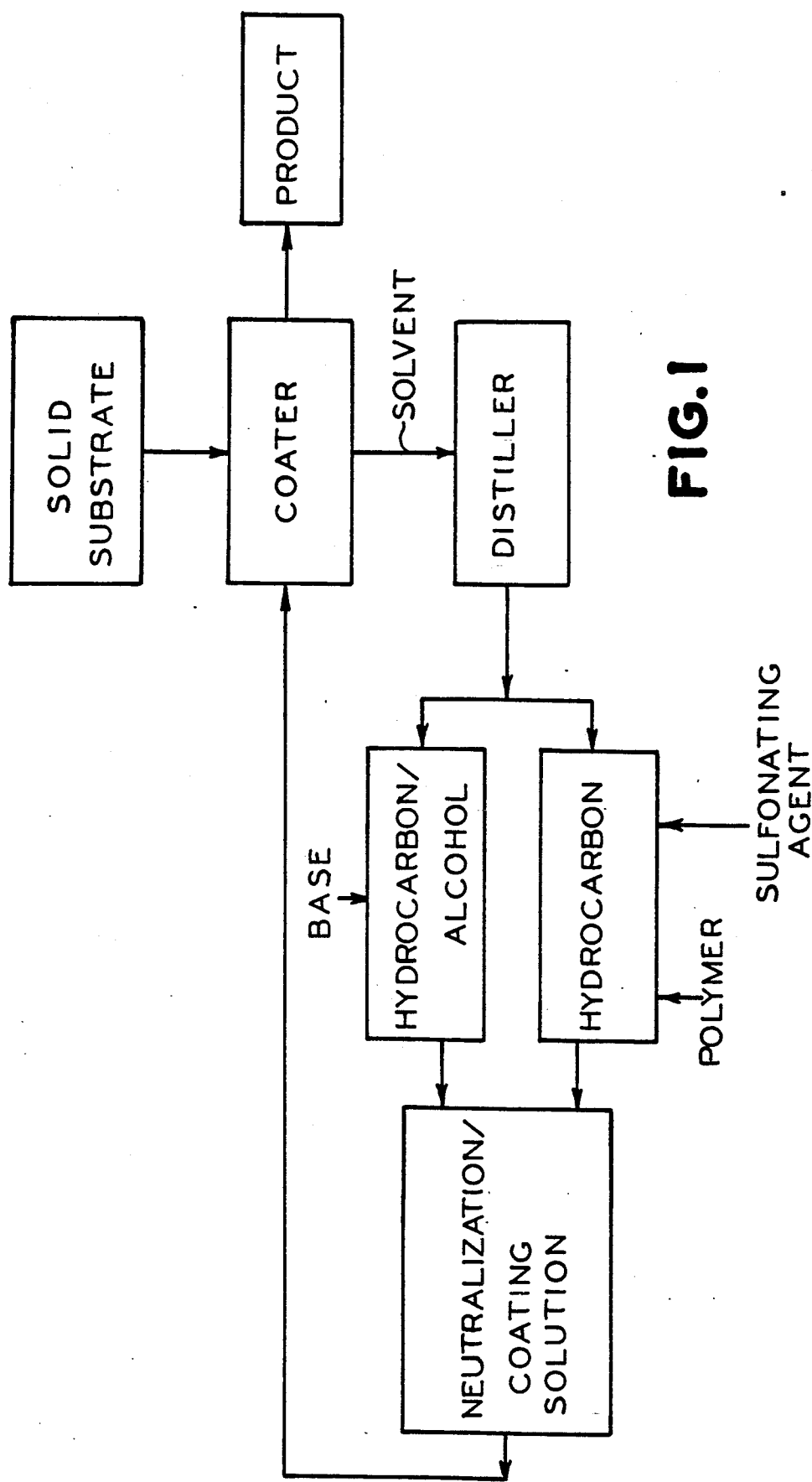
FIG. 1 illustrates a process for preparing a sulfonated polymer coating solution by neutralizing a sulfonated polymer solution with a solution of base, removing and recovering the solvent, separating an alcohol-hydrocarbon azeotrope from hydrocarbon, recycling the hydrocarbon as the polymer sulfonation solvent and the azeotrope as the base solvent.

The present invention relates to improvements in coating a solid substrate by using a sulfonated polymer solution directly as generated during the sulfonation process.

The coating solution of the instant process generally includes a water insoluble metal neutralized sulfonated polymer dissolved in an organic solvent system to form a solution with a concentration level of from about 0.1 to about 20 weight percent polymer based on the total weight of solution. The solvent system comprises hydrocarbons selected from aliphatic and aromatic hydrocarbons and mixtures thereof and aliphatic alcohols. In general, the aliphatic hydrocarbons will have from about 4 to about 30 carbon atoms; the aromatic hydrocarbons will have from about 6 to 30 carbon atoms; and the alcohols will have from about 1 to about 5 carbon atoms and, preferably, from about 1 to about 3 carbon atoms.

The water insoluble sulfonated polymers of the instant invention will have from about 4 to about 200 milliequivalents of pendant sulfonate groups per 100 grams of polymer, more preferably from 10 to 100 meq. pendant sulfonate groups neutralized with an alkali metal and mixtures thereof. Most preferably, the sulfonate groups are neutralized with sodium hydroxide.

The coating solution of the present invention is prepared by first dissolving an unsaturated polyolefin or styrene type polymer in a hydrocarbon solvent. In general, the hydrocarbon solvent will be selected from aliphatic and aromatic hydrocarbons and mixtures thereof. Typically, the aliphatic hydrocarbons will have from 4 to 30 carbon atoms; the aromatic hydrocarbons will have from 6 to 30 carbon atoms and may include aralkyl compounds. Representative polymers and hydrocarbon solvents are given in Table 1.

TABLE 1

| Polymer | Hydrocarbon Solvent |
| --- | --- |
| polystyrene, polyvinyltoluene | aliphatic and cyclic pentanes, hexanes, heptanes, decanes, and mixtures thereof. |
| ethylene-propylene terpolymer (EPDM) | aliphatic and aromatic hydrocarbons and mixtures thereof, including benzene, toluene, xylene, ethyl benzene, pentanes, hexanes, heptanes, octanes, nonanes and decanes. |
| polyisobutylene | saturated aliphatic hydrocarbons, aromatic and alkyl substituted aromatic hydrocarbons and mixtures thereof. |

In a preferred embodiment of the present invention, an EPDM terpolymer is dissolved in a hydrocarbon solvent. In the EPDM polymer, the diene monomer is, preferably, a non-conjugated diene. Illustrative of these non-conjugated, diene monomers which may be used in the terpolymer (EPDM) are 1,4-hexadiene, dicyclopentadiene, 5-ethylidene-2-norbornene, 5-methylene-2-norbornene, 5-propenyl-2-norbornene and methyl tetrahydroindene.

After dissolving the polymer in the hydrocarbon solvent, a sufficient amount of a sulfonating agent is added at a temperature and for a time sufficient to sulfonate the polymer, thereby forming a solution of sulfonated polymer containing free acid. The preferred sulfonating agent employed in the present invention is an acyl sulfate. The acylsulfate can be preformed, or as a matter of convenience, the acyl sulfate may be generated in situ by adding a carboxylic acid anhydride and sulfuric acid to the polymer solution.

Next, a solution of a base in an aliphatic alcohol or a mixture of an aliphatic alcohol and a hydrocarbon is formed. The base will be selected from the group consisting of alkali metal hydroxides and mixtures thereof and especially sodium or potassium hydroxide. The aliphatic alcohol generally will be selected from aliphatic alcohols having from about 1 to about 5 carbon atoms and, preferably, from about 1 to 3 carbon atoms, and most preferably 1 to about 2 carbons. The hydrocarbon will be selected from the group consisting of aliphatic and aromatic hydrocarbons and mixtures thereof. Particularly preferred aliphatic hydrocarbons include those having from about 1 to 30 carbon atoms. Particularly preferred aromatic hydrocarbons include those having from about 6 to about 30 carbon atoms, such as aralkyl hydrocarbons. In general, the concentration of the alcohol will range from about 1 to about 15 wt.% and, more preferably, from about 2 to about 8 wt.% of the total weight of the solution. The concentration of the base is sufficient to neutralize the acid formed during the sulfonation of the unsaturated polymer, as well as to neutralize the free acid generated in that process.

The solution of base then is added to the solution of sulfonated polymer containing free carboxylic acid in an amount sufficient to neutralize the sulfonated polymer and free carboxylic acid and thereby provide a coating solution.

In accordance with the practice of the present invention, the solid substrate is coated or encapsulated with the coating solution by applying the coating solution to the substrate at an ambient temperatures and higher but preferably at 10° C. to 50° C. by spray coating or similar techniques. The solvent is permitted to evaporate, with or without the aid of a forced drying gas, such as air or nitrogen, in what will be referred to here as the drying process. The drying process can be conducted at temperatures ranging from ambient up to the boiling point of the solvent system. Thus, in effect, the solvent is removed while the coating solution is in contact with the solid substrate.

After drying, the thickness of the applied coating should be about micrometer to about 100 micrometers. Most preferred, the coating thickness should be 2 to about 20 micrometers. To control the thickness of the applied coatings, the solution concentration of the neutralized sulfonated polymer can be controlled. As indicated previously, generally, concentrations of from about 0.1 to about 20 wt.% may be employed; however, it is preferred that the concentration of the polymer in the solution be in the range of about 0.5 to about 6 wt.%.

As will be readily appreciated, the coating solution of the neutralized sulfonated polymer can be applied in single or multiple layers, with the hydrocarbon solvent being evaporated after each layer application.

In a particularly preferred embodiment of the present invention, the organic solvent which is removed during drying is recovered. Because this solvent consists of a mixture of hydrocarbons and aliphatic alcohol, the two are separated by distillation. Depending on the choice of hydrocarbon and alcohol, the resulting distillation may result in the separation of a hydrocarbon from an azeotropic mixture of hydrocarbon and aliphatic alcohol. In such a case, the former is, preferably, recycled to dissolve the unsaturated polymer and the latter is, preferably, recycled to dissolve the base. Also, if distillation results in separation of hydrocarbon from alcohol, these solvents are, preferably, recycled.

The sulfonated polymeric coating solution can be used to provide a barrier or controlled release coating on substrates such as fertilizers, micronutrients, seeds and other agricultural solid particles.

The following example will demonstrate the preferred embodiment of the present invention.

EXAMPLE 1

300 g of Royalene 521 was dissolved in 3300 g of dry toluene, thereby providing a solution of an EPDM polymer in a hydrocarbon solvent. Royalene 521 is a terpolymer of ethylene, propylene and ethylidene norbornene (ENB) containing about 49% ethylene and 6%

ENB and has a Mooney viscosity (125° C.) of about 29. The product is sold by Uniroyal Corp., Middlebury, Conn.

To the EPDM solution was added 12.4 g of acetic anhydride and 4.2 ml (7.74 g) 95% sulfuric acid, thereby generating an acyl sulfate in solution and resulting in the sulfonation of the EPDM polymer.

A second solution was prepared by dissolving 12.7 g of sodium hydroxide in a simulated azeotrope of 240 g of methanol and 93 g of toluene. This second solution was added to the first solution after the sulfonation had proceeded for about 30 minutes. The net result was the formation of a coating solution.

A small sample of the coating solution was poured into isopropyl alcohol to recover the polymer, which was washed and dried and subjected to elemental analysis. The polymer was found to contain 0.72% sulfur (22.5 mmole sulfonate/100 g polymer).

The remaining coating solution was diluted with hydrocarbon solvent and used for encapsulation. The recovered solvent can be distilled to give a toluene-methanol azeotrope with a pure toluene residue. Both the pure toluene and the azeotrope can be recycled.

EXAMPLE 2

300 g of Vistalon 2504 was dissolved in 3300 g of dried toluene, thereby providing a solution of an EPDM polymer in a hydrocarbon solvent. Vistalon 2504 is a product of Exxon Chemical Company, Houston, Tex., containing about 50% ethylene and 4.4% ENB and about 46% propylene and has a Mooney viscosity (125° C.) of 26.

Acetic anhydride (11.5 mls) was added to the EPDM solution and stirred 30 minutes. Concentrated (95%) sulfuric acid 4.2 mls) was added thereby generating an acyl sulfate in solution resulting in the sulfonation of the EPDM polymer. The sulfonated polymer solution was stirred 30 minutes and then a base solution containing 6 g sodium hydroxide, 120 g methanol and 46.5 g toluene was added to the sulfonated polymer solution and stirred 30 minutes. The net result was a coating solution.

A small amount of coating solution was poured into isopropyl alcohol to recover the polymer, which was washed and dried and subjected to elemental analysis. The polymer was found to contain 0.74% sulfur (23.1 mmoles sulfonate/100 g polymer). The remaining coating solution was diluted with hydrocarbon and used for encapsulation.

EXAMPLE 3

Figure 2:
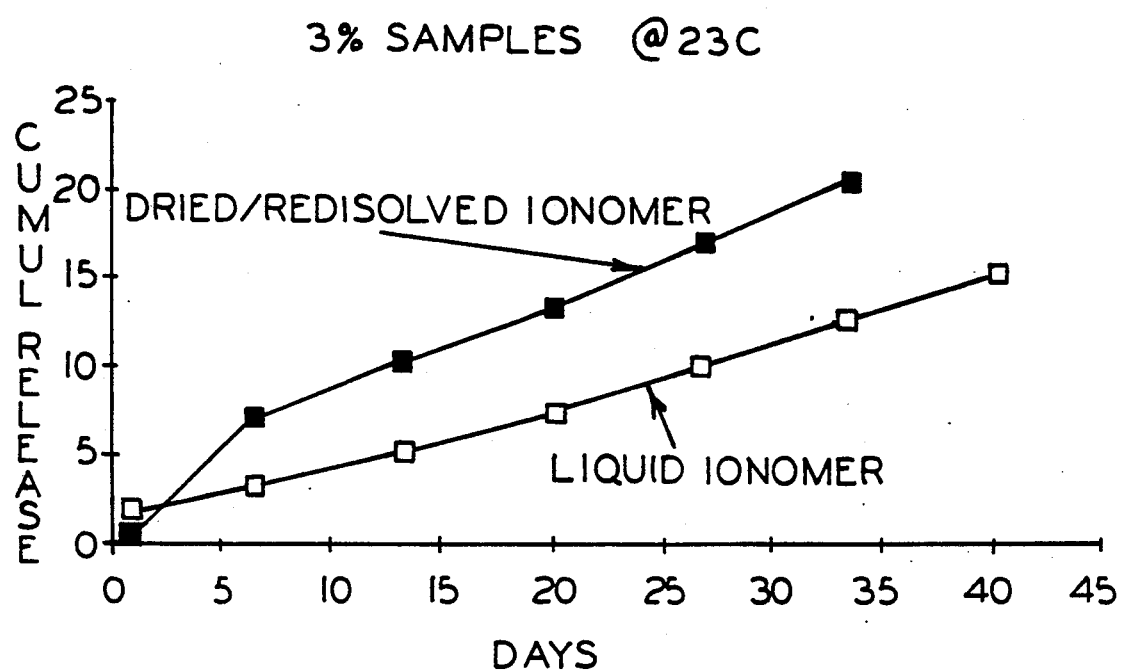
FIG. 2 shows controlled release benefits of polymer made by the process of the present invention in contrast to a coating prepared by a prior art process.

A 3% (wt) coating of neutralized sulfonated EPDM polymer (ionomer) was applied to urea fertilizer prills and the coated prills soaked in water to determine the ability to slow down the rate of release of urea. FIG. 2 shows the release rates of coatings prepared from a redissolved dried crumb of a zinc neutralized ionomer priously available and of coatings prepared from a sodium neutralized ionomer according to the process of this invention.

What is claimed is:

1. A process for the encapsulation of a solid substrate which comprises the steps of:
    (a) forming a solution of an olefin or styrene polymer in a hydrocarbon solvent selected from the group consisting of aliphatic and aromatic hydrocarbons and mixtures thereof;
    (b) contacting the solution of the polymer with a sulfonating agent at a sufficient temperature and for a sufficient period of time to form a solution of a sulfonated polymer containing carboxylic acid;
    (c) forming a solution of a base selected from the group consisting of alkali metal hydroxides and mixtures thereof in a solvent selected from the group consisting of aliphatic alcohols and mixtures of an aliphatic alcohol and a hydrocarbon, the hydrocarbon being selected from the group consisting of aliphatic and aromatic hydrocarbons and mixtures thereof;
    (d) adding the solution of the base to the solution of sulfonated polymer in an amount sufficient to neutralize the sulfonated polymer and carboxylic acid, thereby forming a coating solution; and
    (e) contacting the solid substrate with the coating solution while removing the solvent therefrom, thereby forming an encapsulated substrate.

2. The process of claim 1 wherein the sulfonating agent is an acyl sulfate.

3. The process of claim 2 wherein the polymer is an ethylene propylene diene terpolymer.

4. The process of claim 3 wherein the alkali metal in sodium.

5. The process of claim 3 wherein the acyl sulfate is generated in situ by adding sulfuric acid and a carboxylic acid anhydride to the solution of the diene polymer.

6. The process of claim 2 including the steps of recovering the solvent removed during step (e) and subjecting the recovered solvent to distillation to effect a separation of the solvent into at least a fraction containing substantially hydrocarbon and an alcohol containing fraction and wherein the fraction containing substantially hydrocarbon is recycled to dissolve the polymer in step (a) and the alcohol containing fraction is recycled to dissolve the base in step (c).

7. The process of claim 6 wherein the alkali metal is sodium.

8. The process of claim 7 wherein the hydrocarbon in step (a) and step (c) is selected from aromatic hydrocarbons.

9. The process of claim 7 wherein the hydrocarbon in step (a) and step (c) is selected from aliphatic hydrocarbons.

10. The process according to claim 8 wherein the aliphatic alcohol in step (c) is selected from alcohols having a carbon content of from 1 to 5 carbon atoms.

11. The method of claim 5 wherein the contacting of step (b) is conducted at temperatures of about −20° C. to about 150° C. for about 1 to about 60 minutes.

12. A process for the encapsulation of a solid substrate which comprises the steps of:
    (a) forming a solution of an EPDM terpolymer in a hydrocarbon solvent selected from the group consisting of aromatic hydrocarbons and mixtures thereof;
    (b) contacting the solution of the terpolymer with a sulfonating agent at a sufficient temperature and for a sufficient period of time to form a solution of a sulfonated terpolymer containing carboxylic acid;
    (c) forming a solution of a base selected from the group consisting of sodium and potassium hydroxides and mixtures thereof in a mixture of an aliphatic alcohol and a hydrocarbon, the hydrocarbon being selected from the group consisting of aromatic hydrocarbons and mixtures thereof;
    (d) adding the solution of the base to the solution of sulfonated terpolymer in an amount sufficient to neutralize the sulfonated terpolymer and carboxylic acid, thereby forming a coating solution; and
    (e) contacting the solid substrate with the coating solution while removing the solvent therefrom, thereby forming an encapsulated substrate.

* * * * *